United States Patent
Morikawa et al.

(10) Patent No.: US 7,107,107 B2
(45) Date of Patent: Sep. 12, 2006

(54) PREDICTIVE ACTION DECISION DEVICE AND ACTION DECISION METHOD

(75) Inventors: Koji Morikawa, Kyoto (JP); Takashi Omori, Hokkaido (JP); Yu Ohigashi, Hokkaido (JP); Natsuki Oka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 82 days.

(21) Appl. No.: 10/522,997

(22) PCT Filed: Jan. 30, 2004

(86) PCT No.: PCT/JP2004/000971
§ 371 (c)(1),
(2), (4) Date: Feb. 2, 2005

(87) PCT Pub. No.: WO2004/068399
PCT Pub. Date: Aug. 12, 2004

(65) Prior Publication Data
US 2006/0155664 A1  Jul. 13, 2006

(30) Foreign Application Priority Data
Jan. 31, 2003  (JP) .............................. 2003-023342

(51) Int. Cl.
*G05B 13/02* (2006.01)
*G06F 7/60* (2006.01)
*G06F 17/10* (2006.01)
*G06F 9/45* (2006.01)
*G06F 15/18* (2006.01)

(52) U.S. Cl. ..................... 700/31; 700/28; 700/30; 700/44; 700/47; 703/2; 703/20; 703/22; 706/12; 706/14

(58) Field of Classification Search ............... 700/28, 700/29, 30, 31, 44, 47; 703/2, 6, 12, 22, 703/20; 702/50; 706/12, 14, 45, 11
See application file for complete search history.

(56) References Cited

U.S. PATENT DOCUMENTS 6,745,168 B1 * 6/2004 Enomoto ...................... 706/11

(Continued)

FOREIGN PATENT DOCUMENTS

JP  7-306998 A  11/1995

(Continued)

OTHER PUBLICATIONS

Taku Yoshioka et al., "Kyoka Gakushi ni yoru Othellono Senryaku Kakutoku", Dai 32 Kai Jinko Chino Kisoron Kenkyukai Shiryo, The Japanese Society for Artificial Intelligence, Japan, Mar. 26, 1998, pp. 115 to 120; p. 116, left column, lines 22 to 35.

(Continued)

*Primary Examiner*—Ramesh Patel
(74) *Attorney, Agent, or Firm*—Harness, Dickey & Pierce, P.L.C.

(57) ABSTRACT

In a predictive action determination apparatus (10), a state observation section (12) observes a state with respect to an environment (11) and obtains state data s(t). An environment prediction section (13) predicts, based on the state data s(t), a future state change in the environment. A target state determination section (15) determines, as a target state, a future state suitable for action determination with reference to a state value storage section (14). A prediction-based action determination section (16) determines an action based on a determined target state.

13 Claims, 14 Drawing Sheets

U.S. PATENT DOCUMENTS

| | | | |
|---|---|---|---|
| 6,873,914 B1* | 3/2005 | Winfield et al. | 702/19 |
| 6,937,966 B1* | 8/2005 | Hellerstein et al. | 703/2 |
| 6,954,758 B1* | 10/2005 | O'Flaherty | 707/102 |
| 6,971,063 B1* | 11/2005 | Rappaport et al. | 715/733 |
| 2003/0046130 A1* | 3/2003 | Golightly et al. | 705/7 |
| 2003/0065409 A1* | 4/2003 | Raeth et al. | 700/31 |

FOREIGN PATENT DOCUMENTS

| | | |
|---|---|---|
| JP | 9-245015 A | 9/1997 |
| JP | 9-297690 A | 11/1997 |
| JP | 2002-059384 | 2/2002 |
| JP | 2002-189502 | 7/2002 |

OTHER PUBLICATIONS

Takeshi Ito, "Shogi no Kansosen ni Mirareru Tansakuno Henka Katei", Information Processing Society of Japan Kenkyu Hokoku, Information Processing Society of Japan, vol. 2001, No. 28, Mar. 16, 2001, pp. 47 to 54; p. 48, left column, lines 31 to 40.

Shingo Ochiai et al., "Kyoka Gakushu o Mochiita Kyugi Dosa no Yosoku to Seigyo", The Institute of Electronics, Information and Communication Engineers Gijutsu Kenkyu Hokoku, The Institute of Electronics, Information and Communication Engineers, vol. 97, No. 69, May 23, 1997 (May 23, 1997), pp. 69 to 75; full text; all drawings.

Yasuharu Koike, Kenji Dotani, "Multi Step Jotai Yosoku o Mochiita Kyoka Gakushu-Chumokuten Idoten o Koryo shita Jidosha Unten Model", The Institute of Electronics, Information and Communication engineers Gijutsu Kenkyu Hokoku, The Institute of Electronics, Information and Communication Engineers, vol. 98, No. 673, Mar. 18, 1999 (Mar. 18, 1999), pp. 241-247.

Koichiro Takita et al., "Pulse Neural Network ni Okeru Network Kakuchogata Kyoka Gakushu Algorithm", The Institute of Electronics, Information and Communication Engineers Gijutsu Kenkyu Hokoku, The Institute of Electronics, Information and Communication Engineers, vol. 99, No. 684, Mar. 13, 2000 (Mar. 13, 2000), pp. 181 to 188, full text, all drawings.

* cited by examiner

Mp(LEFT, RIGHT, STAY)

FIG. 3
(a) 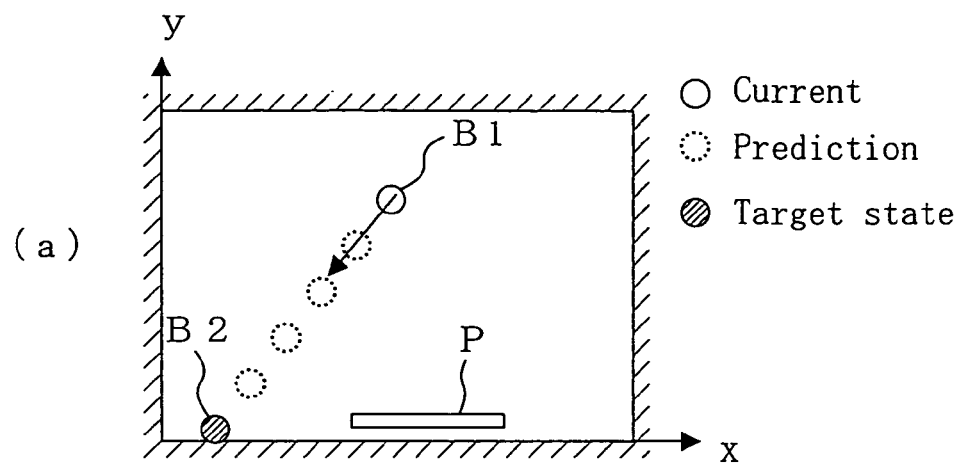
(b) 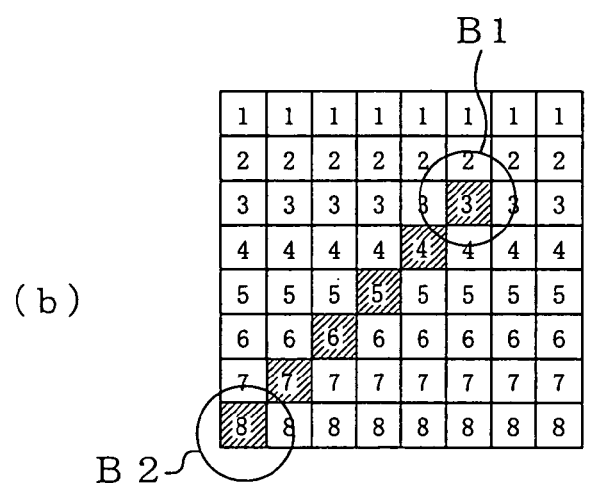
(c) 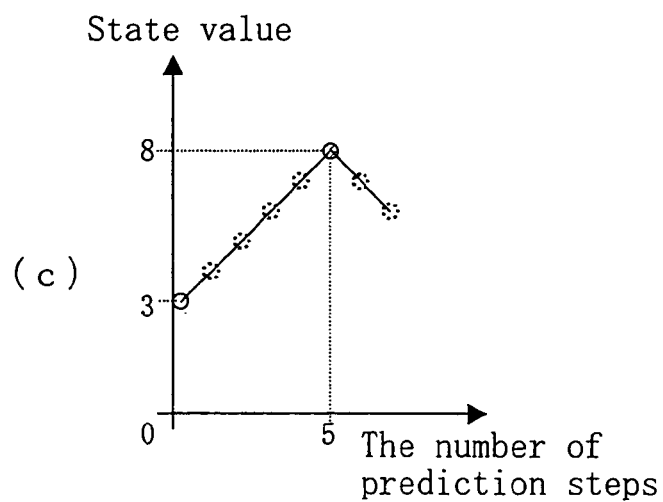

FIG. 10
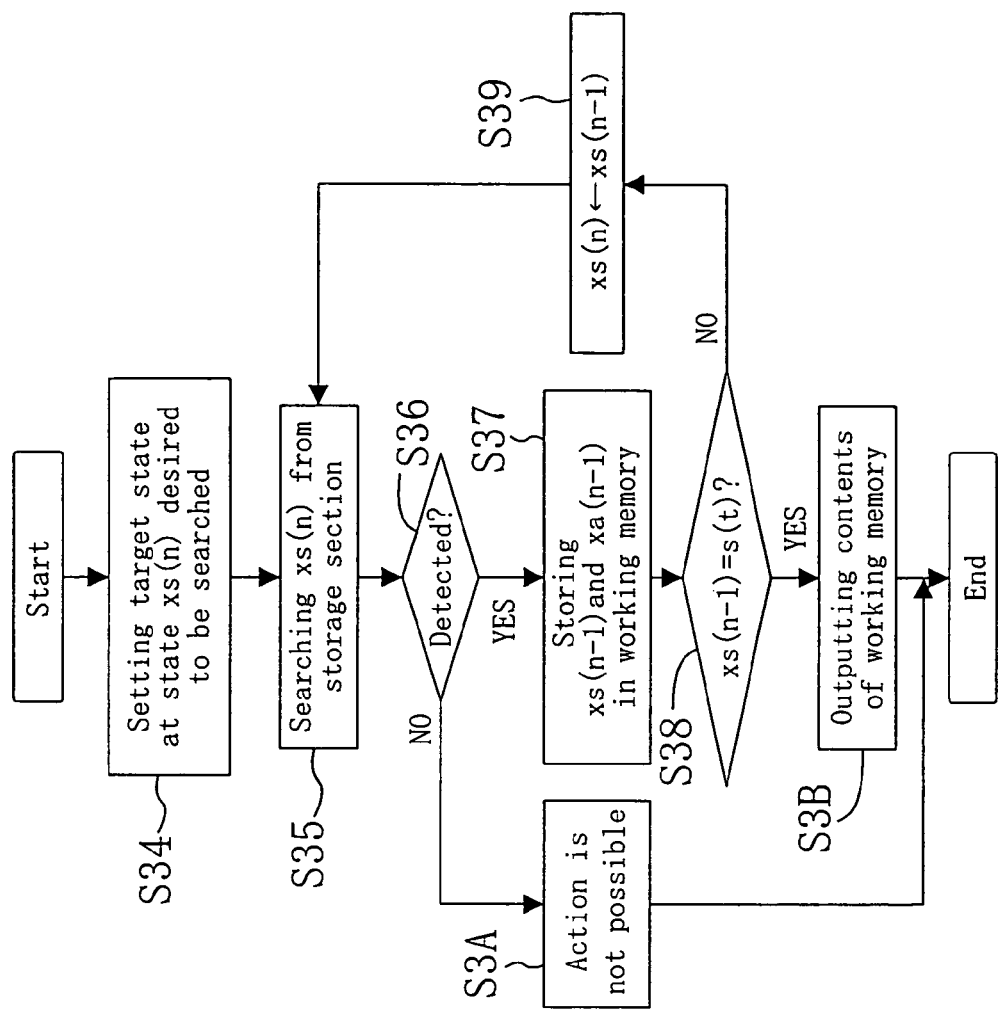
(b) Action planning
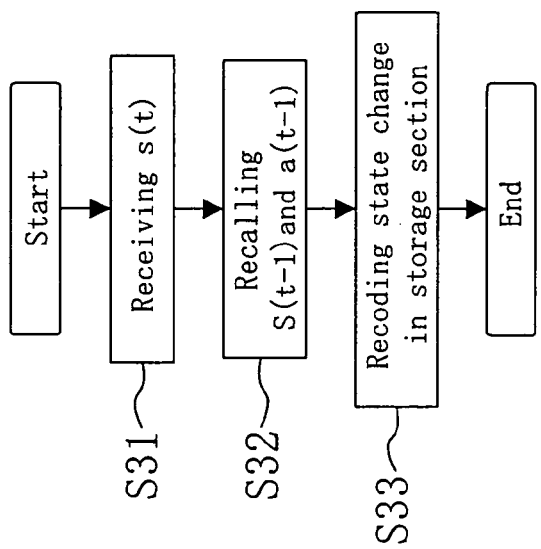
(a) Storing state change

FIG. 11
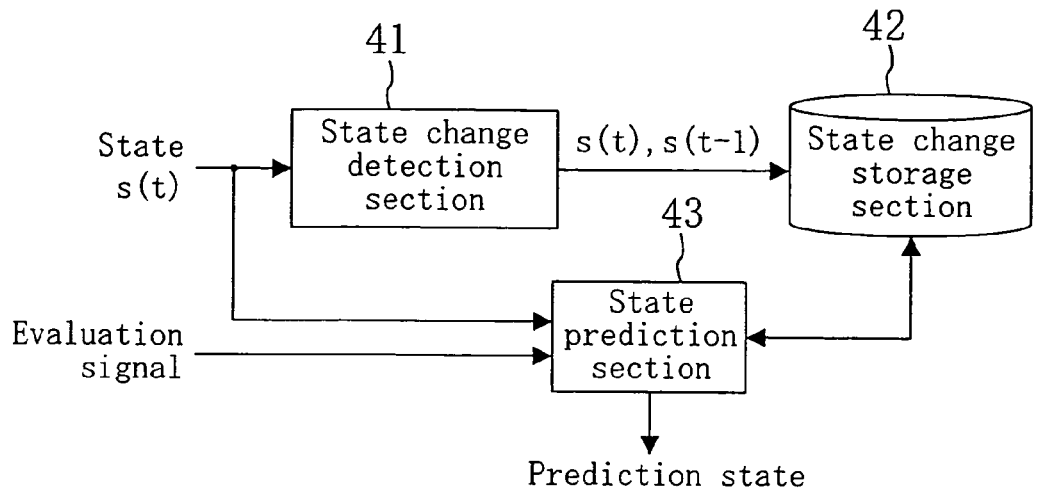
FIG. 12
(a) Storing state change
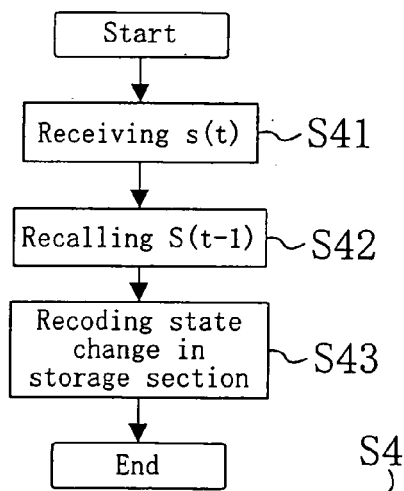
(b) Action prediction
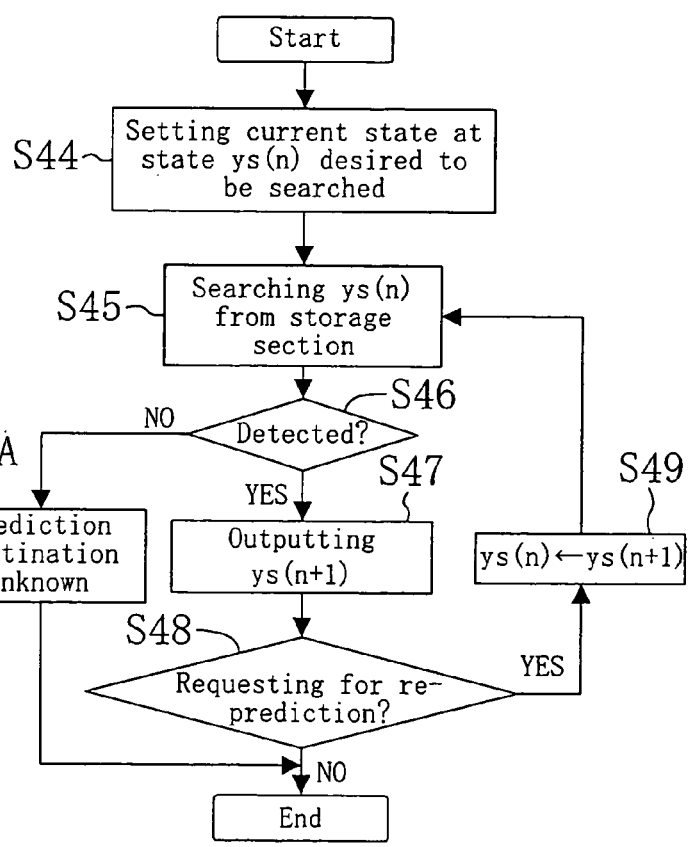

FIG. 16

(a) Before learning

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

(b) Middle of learning

| 0 | 0 | 0 | 0 | 0 | 1 | 2 | 3 |
|---|---|---|---|---|---|---|---|
| 0 | 0 | 0 | 0 | 0 | 1 | 2 | 3 |
| 0 | 0 | 0 | 0 | 0 | 1 | 2 | 3 |
| 0 | 0 | 0 | 0 | 0 | 1 | 2 | 3 |
| 0 | 0 | 0 | 0 | 0 | 1 | 2 | 3 |
| 0 | 0 | 0 | 0 | 0 | 1 | 2 | 3 |
| 0 | 0 | 0 | 0 | 0 | 1 | 2 | 3 |
| 0 | 0 | 0 | 0 | 0 | 1 | 2 | 3 |

(c) After completion of learning

| 1 | 2 | 3 | 4 | 5 | 6 | 7 | 8 |
|---|---|---|---|---|---|---|---|
| 1 | 2 | 3 | 4 | 5 | 6 | 7 | 8 |
| 1 | 2 | 3 | 4 | 5 | 6 | 7 | 8 |
| 1 | 2 | 3 | 4 | 5 | 6 | 7 | 8 |
| 1 | 2 | 3 | 4 | 5 | 6 | 7 | 8 |
| 1 | 2 | 3 | 4 | 5 | 6 | 7 | 8 |
| 1 | 2 | 3 | 4 | 5 | 6 | 7 | 8 |
| 1 | 2 | 3 | 4 | 5 | 6 | 7 | 8 |

PREDICTIVE ACTION DECISION DEVICE AND ACTION DECISION METHOD

TECHNICAL FIELD

The present invention relates to an action determination technique for receiving an input from the outside, predicting how a change is made from a current state to a future state and determining an output to the outside.

BACKGROUND ART

In recent years, systems for industrial use have become more and more complicated and it is getting difficult to have the relationship between an input and an output pre-described by a program or the like. For this reason, methods for processing an input signal to obtain a correct output has become necessary. An apparatus for determining an output from an input will be herein referred to as an "action determination apparatus". Moreover, an apparatus for predicting, from an input signal, a future state change and then obtaining an output is specifically referred to as a "predictive action determination apparatus".

Known techniques for action determination are divided into three groups. A first group includes techniques for performing action determination only based on a current state, a second group includes techniques for performing action determination based on a change from a past state and a third group includes techniques for predicting a future state and performing action determination.

As techniques for performing action determination only from a current state, there are a technique using the IF-THEN rule, a technique using a neural network, a technique using the memory table reference method and the like. In these techniques, an action for a current state has been pre-described, the current state is judged from an input and then an action is determined with reference to a predetermined description.

However, a correct action can not be always determined only based on the current state. For example, in an interactive robot system, when the question of "Is it OK?" is asked, what the question exactly means can not be understood from the question itself. Only after state changes made by the time when the question is asked are referred to, what the question exactly means can be understood. That is, there are cases where a past state is needed for action determination.

Moreover, there are cases where not only the current or past state but also a future state should be considered. For example, assume that a mobile robot avoids an obstacle. At a stage where the robot has not bumped into an obstacle yet, no problem has occurred. In such a case, only after a future change is considered, i.e., it is taken into consideration that if the robot keeps moving in the same moving direction at the same moving speed, the robot will bump to an obstacle in the future, the robot can take an action of avoiding an obstacle before it bumps to the obstacle.

As techniques related to action determination with consideration of a future state, techniques are disclosed in Patent Reference 1 and Patent Reference 2. In Patent Reference 1, current image data or joint angle data is received as a state from an input signal obtained from an environment by a visual sensor and a joint angle sensor. A system stores a change in an image as an action with respect to a target object and a result of the action by a recurrent neural network and if a similar state is received, a stored action is reproduced. This technique is applied to, for example, autonomous action determination of a robot. Moreover, in Patent Reference 2, an action determination technique in reinforcement learning is shown. An error is predicted from a value in a state and a value in a state one step earlier than the state and the obtained information is used for action determination.

Moreover, in Patent Reference 3, disclosed is a technique in which to achieve safety drive control for a vehicle, a drive route is estimated and if a dangerous point exists on the estimated route in the case where a vehicle continues to be driven at a current speed, the driving speed of the vehicle is controlled to a speed ensuring safety according to a driver's skill before the vehicle reaches the dangerous point.

(Patent Reference 1) Japanese Laid-Open Publication No. 2002-59384

(Patent Reference 2) Japanese Laid-Open Publication No. 2002-189502

(Patent Reference 3) Japanese Laid-Open Publication No. 7-306998

Problems that the Invention is to Solve

As has been described, in Patent Reference 1, it is predicted, using a recurrent neural network, into what kind of state a current state is changed by a self-action. Then, according to a result of the prediction, an action stored with a state as a pair is determined.

However, in Patent Reference 1, a past state change due to a self-action is merely leaned by the recurrent neural network and no prediction is made or no consideration is given for or to a change in the environment not relating to the self-action. Moreover, at a certain point of time, action determination is made based on a current state and a prediction for a state one step later than the current state. However, the state one step later is not necessarily important for the action determination and, therefore, the future state prediction can not be considered to be appropriate for the action determination.

Moreover, in Patent Reference 2, an action determined only from a current state and a predicted value for a state one step later than the current state is not necessarily a desired action. For example, if a robot is desired to avoid a vehicle running toward the robot and the speed of the moving robot is much slower than that of the vehicle, the robot is to bump into the vehicle unless an avoidance action is made many steps earlier. In this manner, when an action determination should be made by looking ahead to future, not only a state one step later but also a future state have to be considered and an action have to be determined. Moreover, for example, like in the above-described case where the robot is desired to avoid a running vehicle, if no change is recognized when a current state and a value for a state one step later than the current state are looked at but a crucial situation is to occur many steps later, an action determined based on the current state and the value for the state one step later might become a useless action.

Moreover, in Patent Reference 3, a drive route along which a vehicle travels in the future is first estimated using map information and vehicle position information and then if a dangerous point exists along the estimated route in the case where the vehicle travels along the estimated route at a current speed, a vehicle speed plan in which a target vehicle speed is set for each point is made. That is, on the assumption that a vehicle travels on a road, it is judged using information for the road whether or not there exists a dangerous point to be a target which should be dealt with. However, if information for a future state such as road information has not been given beforehand, it is not definitely easy even to set up an appropriate target for action determination. Furthermore, in this technique, it is very difficult to determine an action with respect to various situations which have never been experienced.

DISCLOSURE OF INVENTION

It is an object of the present invention to more properly perform, in a predictive action determination apparatus, a future state prediction for action determination to improve accuracy and capability of the action determination.

The present invention has been devised with focus on the following points. That is, of states of an environment, there are two states, i.e., a state influenced by an action (i.e., an output) of a self (i.e., a predictive action determination apparatus) and a state which is not influenced by the self-action. For the former one, it is difficult to make a state prediction for a long future. On the other hand, for the latter one, a prediction can be made not only for a state one step later but also for a long future in a relatively simple manner.

Specifically, according to the present invention, an environment is observed, a future state change in the environment is predicted, and with reference to a state value relating to each predicted future state, a future state suitable for action determination is determined as a target state. Then, based on the determined target state, a self-action is determined. Thus, an action is determined based on the target state determined with reference to the state value relating the future state. Therefore, the accuracy of action determination can be improved, compared to the known techniques.

BRIEF DESCRIPTION OF DRAWINGS

FIG. 3 is a view illustrating prediction-based action determination according to the present invention.

FIG. 10 is a flowchart illustrating the operation of the configuration of FIG. 9.

FIG. 11 is a diagram illustrating the internal configuration of the environment prediction section in a fourth embodiment of the present invention.

FIG. 12 is a flowchart illustrating the operation of the configuration of FIG. 11.

FIG. 16 is a view conceptually illustrating steps for learning a state value.

BEST MODE FOR CARRYING OUT THE INVENTION

Figure 1:
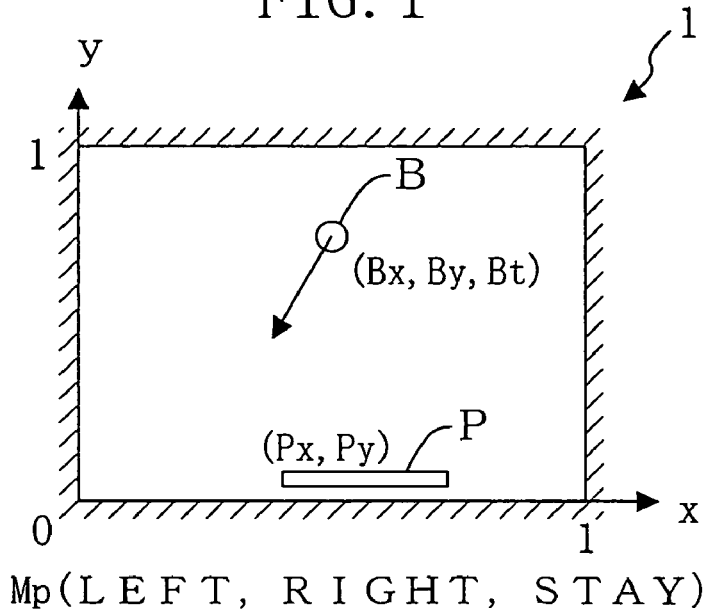
FIG. 1 is a view illustrating an example for describing the present invention and each embodiment of the present invention.

According to a first aspect of the present invention, provided is a predictive action determination apparatus including: a state observation section for observing a state with respect to a predetermined environment and obtaining state data; a state value storage section for storing a state value for each of states of the environment; an environment prediction section for predicting a future state change in the environment, based on the state data obtained by the state observation section; a target state determination section for determining, as a target state, a future state suitable for action determination among future states predicted by the environment prediction section, based on the state value for each of future states stored in the state value storage section; and a first action determination section for determining a self-action, based on the target state determined by the target state determination section.

According to a second aspect of the present invention, provided is a predictive action determination apparatus of the first aspect in which the environment prediction section predicts a future state change in the environment which is not influenced by a self-action.

According to a third aspect of the present invention, provided is a predictive action determination apparatus of the third aspect in which the target state determination section determines, as a target state, a future state of which a state value is maximal.

According to a fourth aspect of the present invention, provided is a predictive action determination apparatus of the first aspect, further including a state value update section for updating, by learning, the state value stored in the state value storage section, in which the target state determination section determines, as the target state, one of the future states of which a state value has been already updated by the state value update section.

According to a fifth aspect of the present invention, provided is a predictive action determination apparatus of the first aspect in which the target state determination section discounts the state value obtained from the state value storage section according to the number of steps from a current step and uses the discounted state value.

According to a sixth aspect of the present invention, provided is a predictive action determination apparatus of the first aspect in which the state value storage section stores a state value for a state including a self, and the predictive action determination apparatus further includes: a value conversion section for obtaining, based on the state value stored in the state value storage section, a state value for a future state which is predicted by the environment prediction section and does not include a self and giving the obtained state data to the target state determination section.

According to a seventh aspect of the present invention, provided is a predictive action determination apparatus of the first aspect further including: a second action determination section for determining an action of the apparatus, based on a predetermined action policy; and an action selection section for receiving actions determined by the first and second action determination section, respectively, as first and second action candidates and selecting one of the first and second action candidates as an actual action.

According to an eighth aspect of the present invention, provided is a predictive action determination apparatus of the seventh aspect in which the target state determination section gives a selection signal indicating whether or not a target state could be determined to an action selection section, and if the selection signal indicates that a target state is determined, the action selection section selects the first action candidate while if the selection signal indicates that a target state could not be determined, the action selection section selects the second action candidate.

According to a ninth aspect of the present invention, provided is a predictive action determination apparatus of the first aspect in which the first action determination section includes: a state-change-with-action detection section for receiving the state data and detecting, from a current state indicated by the state data, a state and an action in a previous step; a state-change-with-action storage section for storing, as a state change, the current state and a combination of the state and the action in the previous step detected by the state-change-with-action detection section; and an action planning section for searching the state-change-with-action storage section for a history of a state change in a period between the current state and the target state and determining an action, based on a result of the search.

According to a tenth aspect of the present invention, provided is a predictive action determination apparatus of the ninth aspect in which the action planning section performs a backward search in the direction from the target state to the current state when the state change storage section performs the search.

According to an eleventh aspect of the present invention, provided is a predictive action determination apparatus of the first aspect in which the environment prediction section includes: a state change detection section for receiving the state data and detecting a state in a previous step from a current state indicated by the state data; a state change storage section for storing, as a state change, a combination of the current state and the state in the previous step detected by the state change detection section; and a state prediction section for predicting a state after the current state from the state change storage section.

According to a twelfth aspect of the present invention, provided is an action determination method for determining a self-action in a predictive action determination apparatus, including: a first step of observing a state with respect to a predetermined environment and obtaining state data; a second step of predicting a future state change in the environment, based on the obtained state data; a third step of determining, as a target state, a future state suitable for action determination among predicted future states, with reference to the state value for each of the future states; and a fourth step of determining a self-action, based on a determined target state.

According to a thirteenth aspect of the present invention, provided is an action determination method of the twelfth aspect in which a predicted state change is a future state change in the environment, which is not influenced by the self-action.

According to a fourteenth aspect of the present invention, provided is an action determination method of the twelfth aspect in which in the third step, one of the future states of which a state value is maximal is determined as the target state.

According to a fifteenth aspect, provided is an action determination method of the twelfth aspect in which the predictive action determination apparatus updates a state value for each of states of the environment by learning, and in the third step, one of the future states of which a state value has been already updated is determined as a target state.

First, the basic concept relating to the present invention will be described.

FIG. 1 is a view illustrating an example of problems. In FIG. 1, a ball B moves straight ahead in a space 1 expressed by coordinates (0, 0) and (1, 1). When the ball B hits an upper, down, right or left wall of the space 1, the ball B rebounds. A paddle P can move only in the left or right direction. A state of the ball B is expressed by position coordinates (Bx, By) and a direction Bt in which the ball B moves and a state of the puddle P is expressed by position coordinates (Px, Py). Py is fixed at 0.

In each time step, as a manipulation MP of the puddle P, any one of {LEFT (to move to the left), RIGHT (to move to the right) and STAY (not to move)} is selected. Then, when the ball B could be hit by the puddle P, a positive reward is given. On the other hand, the ball B could not be hit by the puddle P, a negative reward is given. A task here is to increase the number of times of hitting the ball B by the paddle P so as to increase an accumulated reward.

If this is considered to be an action determination problem, the manipulation MP of the puddle P should be selected so that as many rewards as possible can be obtained when a state (Bx, By, Bt, Px) with respect to the ball B and the puddle P are given as an input in each step.

A method in which an action is determined for such a problem, for example, using a state value and an action rule has been known. Such a method will be hereinafter referred to as "policy-based action determination".

Figure 2:
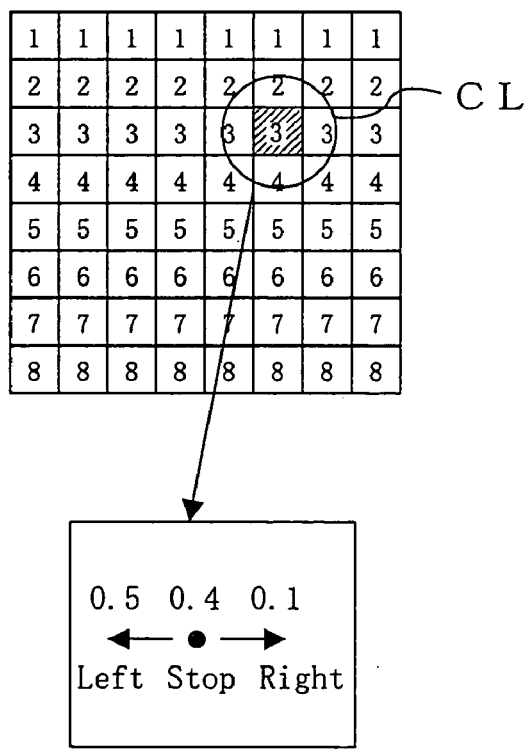
FIG. 2 is a view illustrating an example for a state value and a state-action value used for policy-based action determination.

FIG. 2 is a view illustrating an example for state values and an action rule used for policy-based action determination. In this case, a "state value" means to be a value obtained by evaluating an external state. In the example of FIG. 2, the space 1 of FIG. 1 is divided into cells of 8×8 and in each cell, a state value when the ball B is located in the cell is shown. For example, if the ball B is located in a cell CL, the state value is "3". In the example of FIG. 2, whether or not a reward is given is determined when the ball B reaches a lower surface of the space 1. Thus, the state value is higher in a closer location to the lower surface. The state value is given beforehand or achieved by learning.

Moreover, in each cell, a state-action value showing which action should be taken when the ball B comes to the cell is described. In the example of FIG. 2, with reference to the FIG. 2 correspondingly to FIG. 1, when the puddle P is located around under the ball B4 and the ball B is falling toward the left bottom, as the action rule in the cell CL corresponding to a location of the ball B, values of 0.5, 0.4 and 0.1 are allocated to the action of moving to the left, the action of not moving, and the action of moving to the right, respectively. Based on these values, an action having a maximum value is selected or calculation is performed as an action selection percentage, thereby determining a final action. For example, when the action having a maximum value is selected, in the cell CL, the action of moving to the left, which has the maximum value of 0.5 is selected.

As has been described, in policy-based action determination, a state value corresponding to a current state (location) of the ball B is referred to and an action is determined based on the action rule corresponding to the state. That is, an action is determined with the current state taken into consideration. Therefore, the policy-based action determination can not be used in the case where an action has to be determined beforehand such as the case where the speed of the ball B is fast and the like.

In contrast, according to the present invention, "prediction-based action determination" is performed. Specifically, as shown in FIG. 3(a), with respect to the current ball location B1, respective future ball locations in a plurality of steps are predicted, a ball location B2 to be a target state suitable for action determination is determined, and then action determination is performed based on the target state.

FIG. 3(b) is a table in which a state value for each of predicted ball locations is stored and FIG. 3(c) is a graph showing change in the state value with respect to the number of prediction steps. As can be seen from FIG. 3(c), as the number of prediction steps is increased, the ball B moves toward the lower surface. With this movement of the ball B, the state value is gradually increased. Then, after the ball B has reached the lower surface, the ball B moves upward and, therefore, the state value starts reducing. Thus, the state value takes the maximum value, i.e., "8" when the number of prediction steps is 5. In this case, for example, if a number for the number of prediction steps with which the state value takes the maximum value and a prediction state are used for action determination, the ball location B2 is selected as the target state. This is the same meaning that a state when the ball B is in a closest location to the lower surface is set as the target state. In this manner, if action determination is performed by predicting a future state change which is not influenced by a self-action and setting as the target state one of predicted states which is suitable for action determination, a current state can be more accurately determined.

Hereinafter, embodiments of the present invention will be described with reference to the accompanying drawings. Note that in the following description, the problem of FIG. 1 is dealt with as a task. The problem of FIG. 1 is that a ball moves as a ping-pong ball and when the ball is hit, a reward is given. This can be assumed to be the same setting as those for the action of intercepting the ball in a soccer game, the action of a mobile robot to avoid an approaching object and like action. In the case of a robot's action of avoiding an approaching object, it is possible to determine an action by setting a series of prediction of the movement of the approaching object and avoidance of the object as a target state. In addition to this, action determination performed when a robot receives an object and the like is the same problem.

FIRST EMBODIMENT

Figure 4:
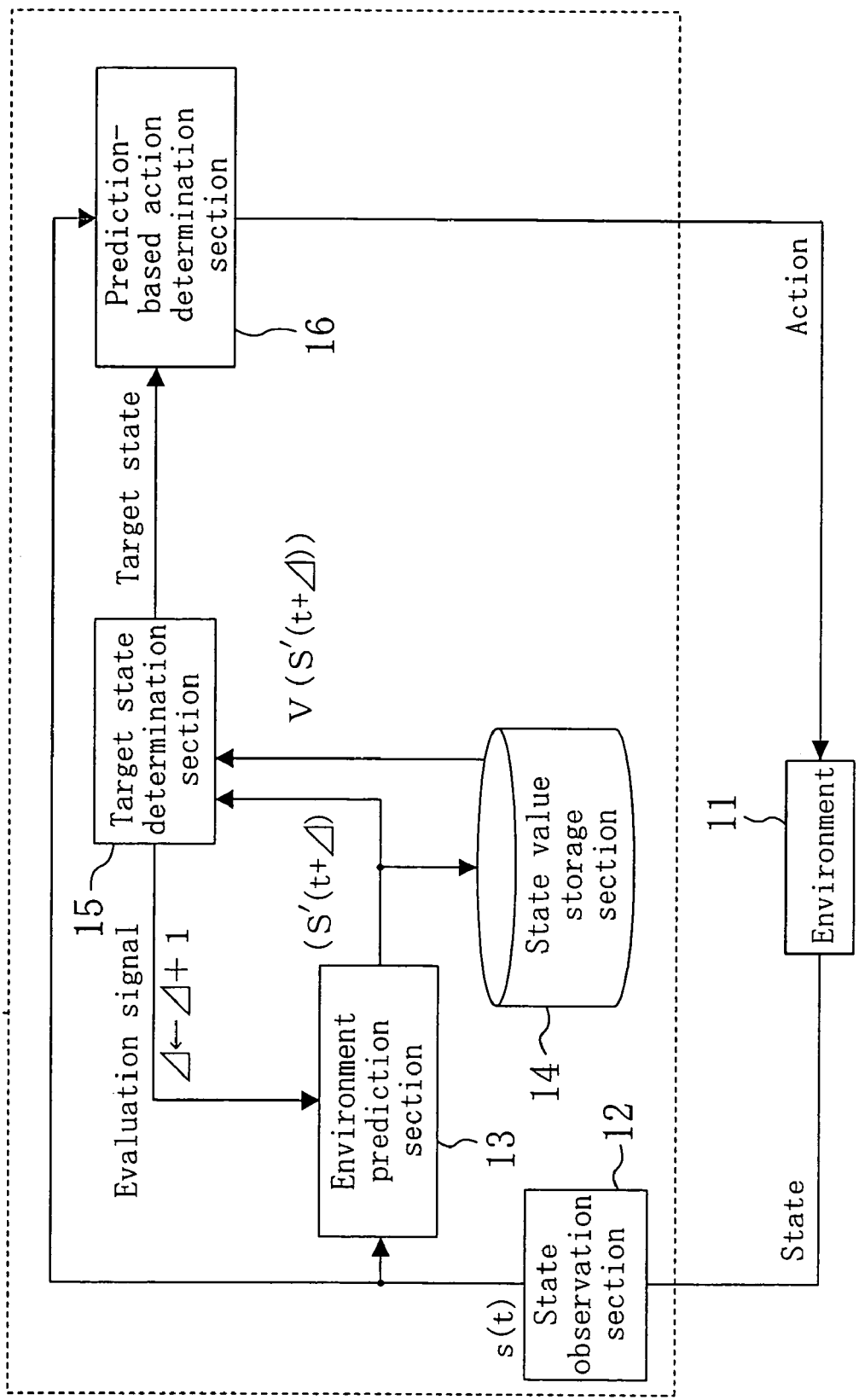
FIG. 4 is a block diagram illustrating the configuration of a predictive action determination apparatus according to a first embodiment of the present invention.

FIG. 4 is a block diagram illustrating a predictive action determination apparatus 10 according to a first embodiment of the present invention. The predictive action determination apparatus 10 observes a state with respect to a predetermined environment 11, predicts a state change with respect to the environment 11, which is not influenced by a self-action, sets a target state and then determines an action with respect to the environment 11.

A state observation section 12 observes the state of the environment 11 and obtains state data indicating a current state. In this case, the state data is expressed as s(t). For the problem of FIG. 1, a state with respect to a ball B and a puddle P (Bx, By, Bt, Px) can be obtained as the state data s(t).

A environment prediction section 13 predicts a future state change with respect to the environment 11 based on the state data s(t) obtained by the state observation section 12. In this case, coordinates of the ball B (Bx, By) are predicted as a state s'. Specifically, the ball B basically moves straight ahead and rebounds to a wall. Therefore, future coordinates can be predicted from current coordinates and an angle of the ball B by analytical calculation. Moreover, in this prediction, a manipulation MP of the puddle P does not have to be taken into consideration. Specifically, a future state change which is not influenced by the predictive action determination apparatus 10 is predicted. In this embodiment, the environment prediction section 13 includes such predicting function in advance. Note that such predicting function can be achieved by learning or the like. This will be described later.

As shown in FIG. 3(b), a state value storage section 14 stores a state value for each state s', i.e., a location (Bx, By) of the ball. In this case, the state value with respect to the state s' is referred to as "V(s')". In this problem, when the ball B hits a bottom wall, whether or not a reward is given is judged. Therefore, a higher state value is set in a closer location to the bottom wall. Note that it is preferable that the state value is set for each of all states. However, it is actually difficult to achieve a setting for each state and, therefore, for example, the state value may be set for only a specific part of the states.

Moreover, an element of the state s' may include a direction Bt in which the ball B moves. In such a case, a state value of a state (Bx, By, Bt) can be stored in the state value storage section 14.

A target state determination section 15 determines, as a target state, a future state suitable for action determination, based on a result of a prediction made by the environment prediction section 13. In this case, a state value $V(s'(t+\Delta))$ is obtained for each future state $s'(t+\Delta)$ predicted by the environment prediction section 13 through a plurality of steps with reference to the state value storage section 14 and then a target state is determined from the obtained state value.

A prediction-based action determination section 16 as a first action determination section determines what kind of action should be currently taken with respect to the target state determined by the target state determination section 15. In this case, if coordinates of the ball B and those of the puddle P are matched to each other, a reward is given. Therefore, a location to which the puddle P can move from the target state to obtain a reward with higher possibility is identified and then the manipulation MP is determined so that the paddle P moves to the location.

Figure 5:
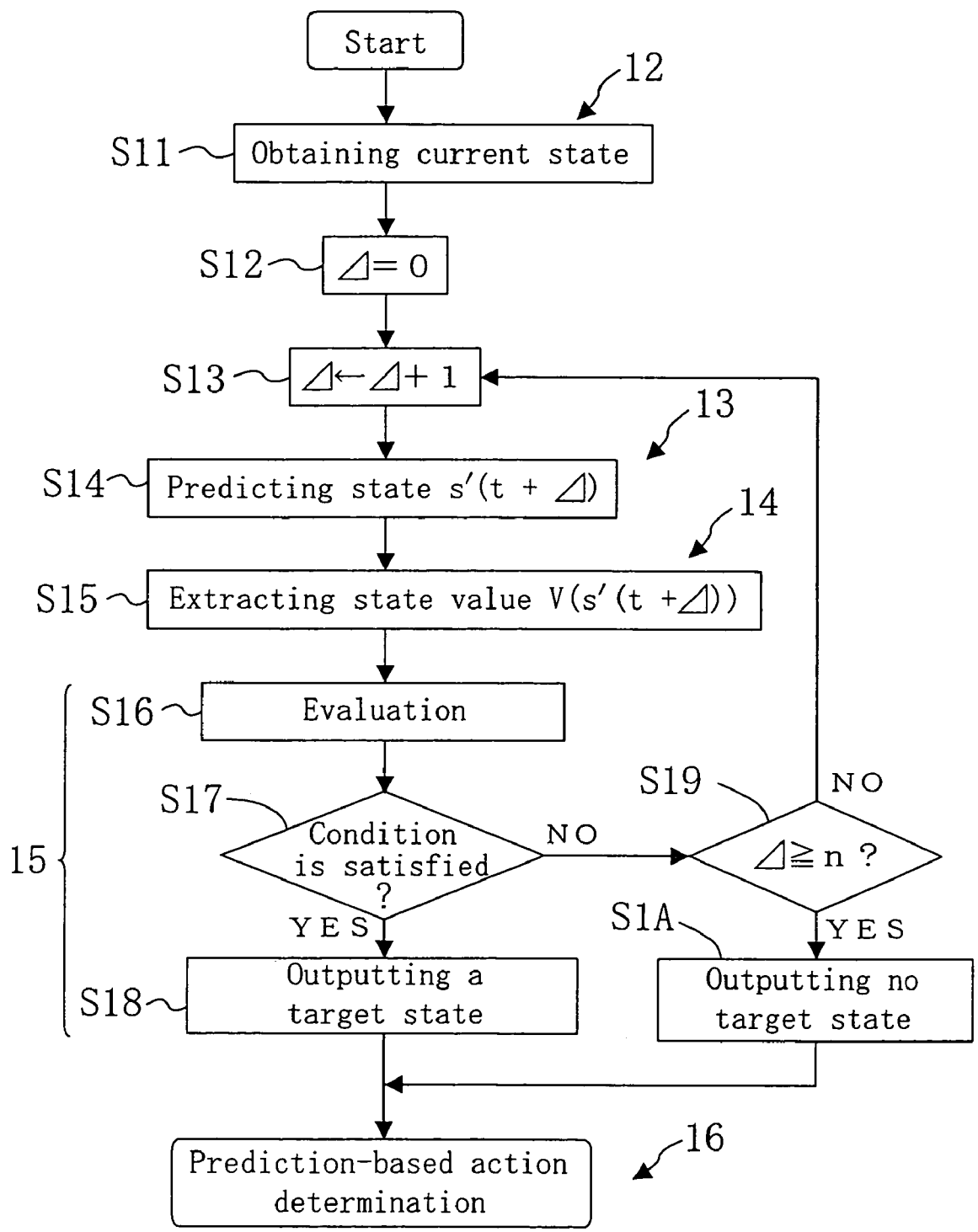
FIG. 5 is a flowchart illustrating the operation of the predictive action determination apparatus of FIG. 4.

Hereinafter, the operation of the predictive action determination apparatus 10 will be described with reference to a flowchart of FIG. 5. First, the state data s(t) for indicating a current state is obtained from the environment 11 by the state observation section 12 (S11). Then, how many steps ahead a prediction is performed for is defined with a variant $\Delta$, and as an initial value for the variant, 1 is given (S12 and S13). Note that until a predetermined condition is satisfied in Step S17 or Δ exceeds a predetermined value n (S19), subsequent Steps S14 through S16 are repeatedly executed while Δ is incremented.

In Step S14, the environment prediction section 13 predicts a state s'(t+Δ), which is Δ steps ahead from the current state. For example, if the ball does not hit a wall, each of Bx and By varies by an amount corresponding to one step, and the direction Bt does not vary. In Step S15, then, a state value V(s'(t+Δ)) of the state s'(t+Δ) predicted in Step S14 is extracted from the state value storage section 14.

In Step S16, the target state determination section 15 evaluates the state value V(s'(t+Δ)) output from the state value storage section 14. In this case, as a condition for evaluation, whether or not the state value exceeds a predetermined threshold is judged. Then, if it is judged that the condition is satisfied, i.e., the state value exceeds the predetermined value (YES in S17), the process proceeds with Step S18 and the state s'(t+Δ) is given as a target state to the prediction-based action determination section 16.

On the other hand, if the condition is not satisfied (NO in S17), the process proceeds with Step S19 and the number of prediction steps is judged. Specifically, if Δ is lower than the predetermined value n (NO in S19), the process returns with Step S13, and after Δ is incremented, the same process step is performed. If Δ is the predetermined value or more (YES in S19), the process proceeds with Step S1A and it is notified to the prediction-based action determination section 16 that the target state could not be determined.

The prediction-based action determination section 16 receives an output from the target state determination section 15 and then determines a subsequent action. However, if it is notified that the target state is not determined, the action determination section 16 determines an action, for example, in a random manner.

As has been described, according to this embodiment, from a result of a prediction of a state change with respect to the environment 11, a future state suitable for action determination is determined as a target state with reference to a state value. Then, based on the target state, a self-action is determined. Because of this, the accuracy of action determination is remarkably improved, compared to known action determination made by predicting a future. Moreover, unlike the known techniques, even if the relationship between a state and an action are not pre-described, an action can be determined. Accordingly, with a simple configuration, action determination becomes possible for various unknown situations. Moreover, a future state change with respect to the environment 11, which is not influenced by an action of the predictive action determination apparatus 10, is predicted, so that not only a prediction for one step ahead but also a prediction for the longer future steps can be accurately performed in a relatively simple manner.

Note that in this embodiment, a state at a time when a state value exceeds a predetermined threshold is determined as a target state. However, in addition to this method, various other methods for determining a target state can be used. For example, a state at a time when the state value takes a maximum value within predicted steps or a state at a time when the state value is maximal may be determined as a target value. Moreover, a state at a time when a difference in the state value from the previous step is smaller than a predetermined value may be determined as a target state. As another alternative, evaluation may be made such that a state value is obtained by discounting the state value by an amount according to the number of steps from the current step.

Note that in this embodiment, state values are stored in the table formant. However, instead of this method, an approximation of function method such as a neural network may be used. In that case, when a current state is input, leaning has to be achieved so that the state value or an expected value for a reward is output.

SECOND EMBODIMENT

Figure 6:
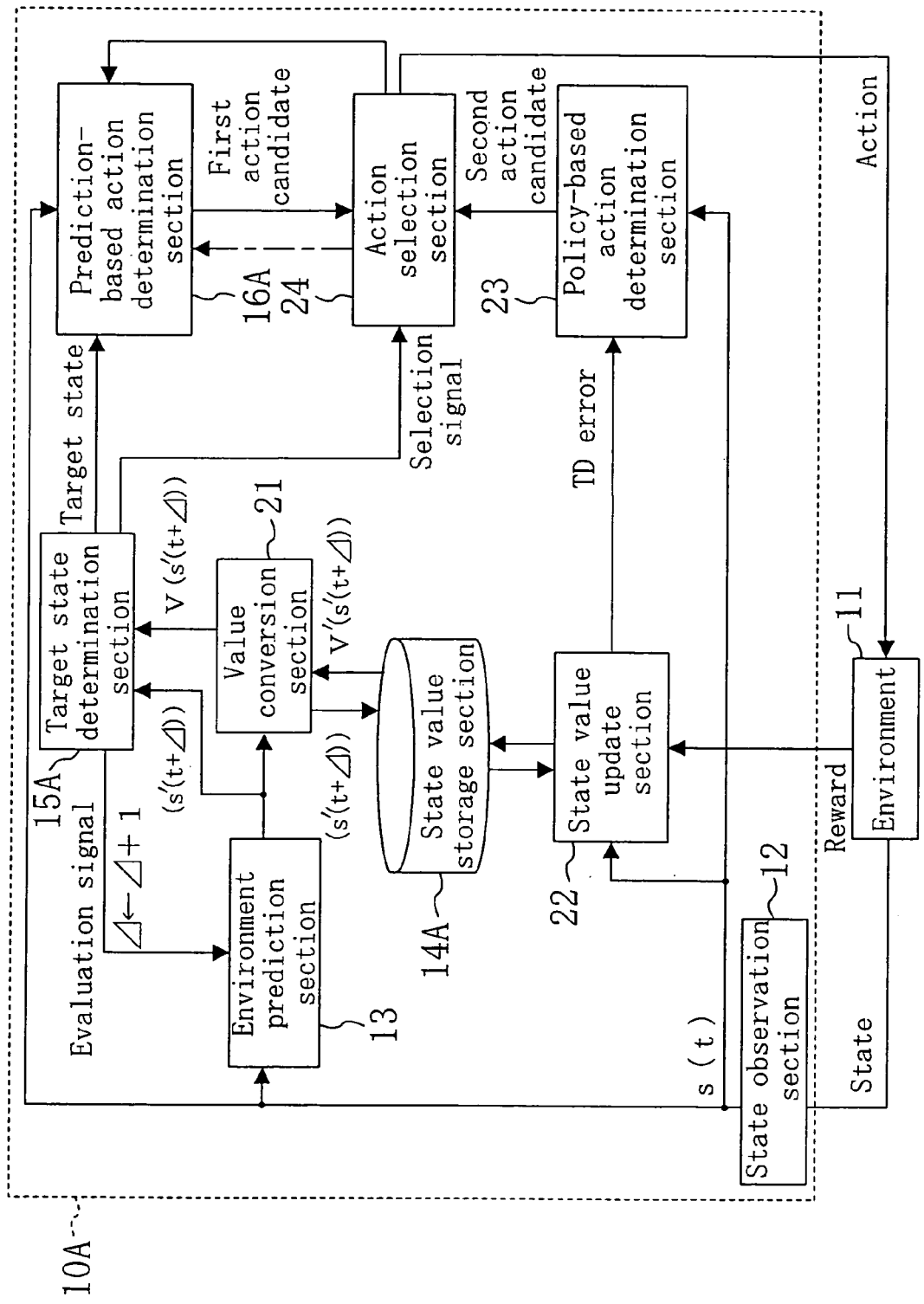
FIG. 6 is a block diagram illustrating the configuration of a predictive action determination apparatus according to a second embodiment of the present invention.

FIG. 6 is a block diagram illustrating the configuration of a predictive action determination apparatus 10A according to a second embodiment of the present invention. In FIG. 6, each member also shown in FIG. 4 is identified by the same reference numeral.

First, a value conversion section 21 will be described. When a state value storage section 14A stores a state value for a state including a state variable by an action of the predictive action determination apparatus 10A, the value conversion section 21 obtains a state value V(s'(t+Δ)) of a future state s'(t+Δ) which is predicted by an environment prediction section 13 and does not include a state variable by an action of the predictive action determination apparatus 10A, based on the state value stored in the state value storage section 14A and then gives it to a target state determination section 15A. In this embodiment, the state value storage section 14A stores a state value for each state (Bx, By, Bt, Px), which includes a location Px of a puddle P, and a future state (Bx, By, Bt) is output from the environment prediction section 13.

Figure 7:
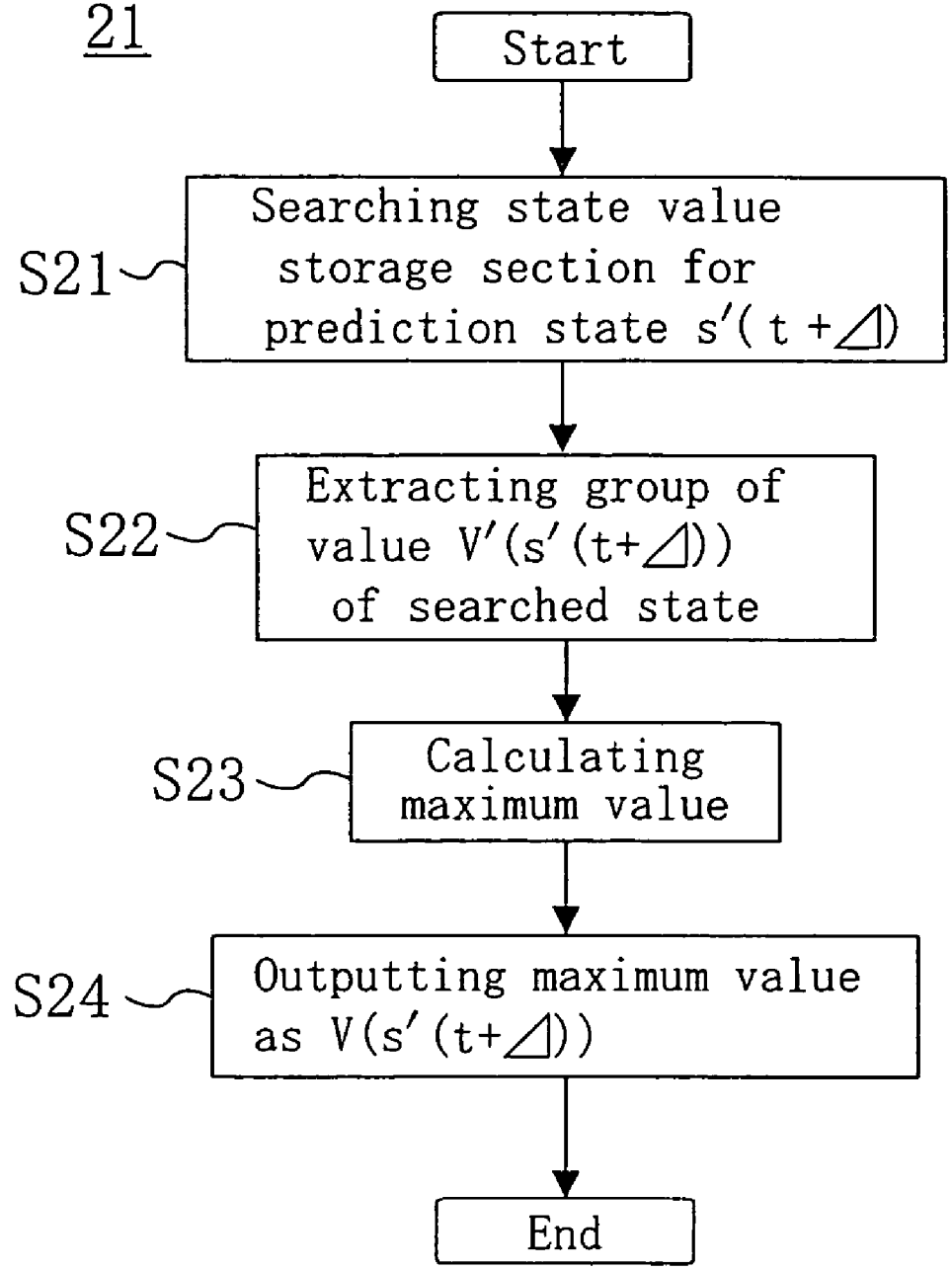
FIG. 7 is a flowchart illustrating the operation of a value conversion section in the configuration of FIG. 6.

The operation of the value conversion section 21 will be described with reference to a flowchart of FIG. 7. First, when the future state s'(t+Δ) is predicted by the environment prediction section 13, the state value storage section 14A is searched for the state s'(t+Δ) (S21). Then, for a state where three elements (Bx, By, Bt) are matched to one another, a group V'(s'(t+Δ)) of states having a state value indicating the state is extracted from the state value storage section 14A (S22). In this case, if it is assumed that there are eight coordinates for the location Px of the puddle P, eight different state values are output as search results.

Then, state values extracted in Step S22 are compared to one another, and a maximum value among them is obtained (S23). The obtained maximum value is output as the state value V(s'(t+Δ)) of the state s'(t+Δ) to the target state determination section 15A.

Moreover, in the first embodiment, state values stored in the state value storage section 14 have been given beforehand. However, in this embodiment, state values are automatically learned by a method called reinforcement learning. "Reinforcement Learning" is a type of learning methods known for R. S. Sutton and A. Barto, *Reinforcement Learning: An Introduction*, (USA), A Bradford Book, The MIT Press, March 1998, and a method for performing learning by a reward signal from an environment and in a trial-and-error manner. And Reinforcement Learning is a learning algorithm for performing action determination to maximize the reward.

In this embodiment, a method called actor-critic learning is used in reinforcement learning (see pp. 151–153 of *Reinforcement Learning: An Introduction*). An actor has an action determination scheme, i.e., a policy in which what action is taken in what state is described. A selection probability is calculated for each of actions a1 through an which are possibly taken at the state s and then an action is determined. In V of a critic, a value indicating an expected value for how many rewards are expected to be obtained in what state, i.e., a state value is stored. The state value is updated using a TD error calculated from the reward. The TD error δ can be calculated using:

$$\delta = r(t+1) + \gamma(V(s(t+1))) - V(s(t))$$

where r (t+1) is a reward and γ is a discount rate. Using the TD error, a state value table V(s) in the critic and the policy of the actor are updated.

By updating the state value stored in the state value storage section 14A using the actor-critic method, even for a state of which the current state value is unclear, an action can be determined by a prediction. A state value update section 22 updates the state value stored in the state value storage section 14A according to the critic table update rule.

In this case, steps for learning the state value will be conceptually described with reference to FIG. 16. When the state value is achieved by learning, the state value is not given initially and the state value is gradually learned according to a learning method such as the above-described reinforcement learning.

In FIG. 16, as in FIG. 2, the space 1 of FIG. 1 is divided into 8×8 cells. In each of the cells, a state value when the ball B is in the cell is shown. FIG. 16(a) shows a state before learning and an initial value "0" is given as a state value to each of the cells. In this case, an appropriate action is not defined in any location and an action can not be determined based on a value.

FIG. 16(b) shows a state in the middle of learning. The state value is updated every time when a reward is given. In this case, a setting is made so that when the puddle P hits a ball B, a positive reward is given, and thus a reward is given when the ball B is located at a location closest to the bottom. According to reinforcement learning, a state value is obtained by calculation such as propagation of a reward. Therefore, as shown in FIG. 16(b), the state value is calculated only for the vicinity of a location in which a reward is obtained, i.e., lower part. In this case, if the ball B comes to a location in which the state value is learned, an action can be determined according to the state value. However, if the ball B is at a location in which the state value is still the initial value, an action can not be determined.

After a sufficient learning period, as shown in FIG. 16(c), a state value has been calculated for each of locations and an action determination based on the state value can be made for each of the locations.

Figure 17:
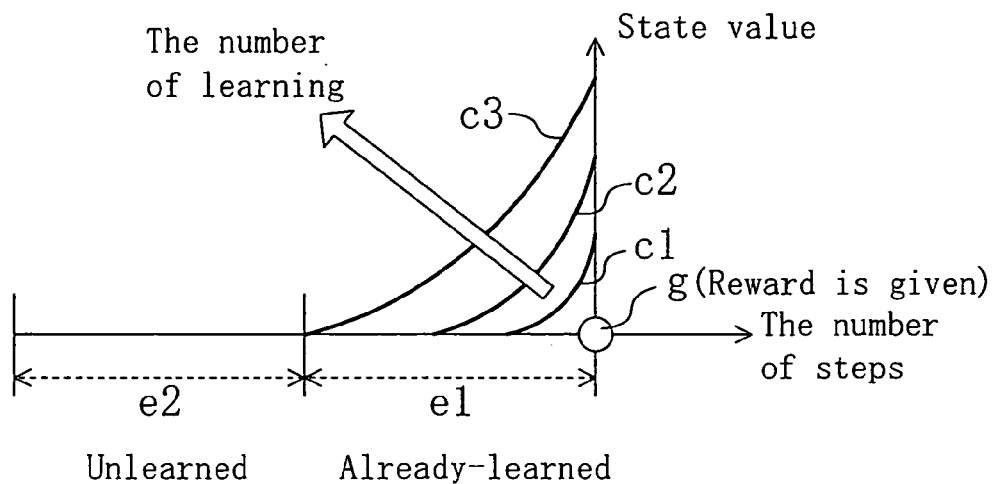
FIG. 17 is a graph conceptually illustrating a change of a state value curve according to the amount of learning.

Moreover, steps of learning the state value can be illustrated by FIG. 17. In FIG. 17, as in FIG. 3(c), change in the state value with respect to the number of prediction steps is illustrated with a graph. If a future location of the ball B can be predicted, a curve for indicating the state value with the abscissa indicating the number of prediction steps and the ordinate indicating the state value can be drawn by referring to state values in FIG. 16.

As has been described, as learning proceeds, the state value is increased and also the state value is propagated from a timing g in which a reward is given to a state in a much earlier step. Specifically, if the learning number is smaller, the state value is learned only for a state immediately before the timing g in which a reward is given, and as the learning proceeds, the state value is also given to a state in a much earlier step than the timing g. That is, a state value curve gradually varies from a curve c1 to a curve c2 and then to a curve c3 as the learning number is increased.

In this case, for example, if a state value is learned in the manner indicated by the curve c3, a state value is allocated to a region e1 and the region e1 becomes a so-called "already-learned" region in which an action can be determined by the state value. On the other hand, for a region e2, a state value is not learned yet and thus the region e2 is a so-called "unlearned region" in which an action can not be determined based on a state value. If it is assumed that the curve c3 corresponds to the state of FIG. 16(b), the unlearned region e2 is equivalent to the case where the ball B is still located in upper part.

If learning has sufficiently proceeded, the unlearned region e2 is eliminated and only the already-learned region e1 exists. This is considered to be equivalent to, for example, the state of FIG. 16(c).

As has been described, as learning proceeds, a state value is allocated to each state, and the already-learned region e1 to which state learning has been given becomes gradually larger while the unlearned region e2 becomes gradually smaller. This is one of features of reinforcement leaning. Therefore, when a future state is predicted through a plurality of steps, the number of the steps to be performed by the time when the already-learned region e1 to which the state value is given is reached is gradually reduced as learning proceeds.

Figure 8:
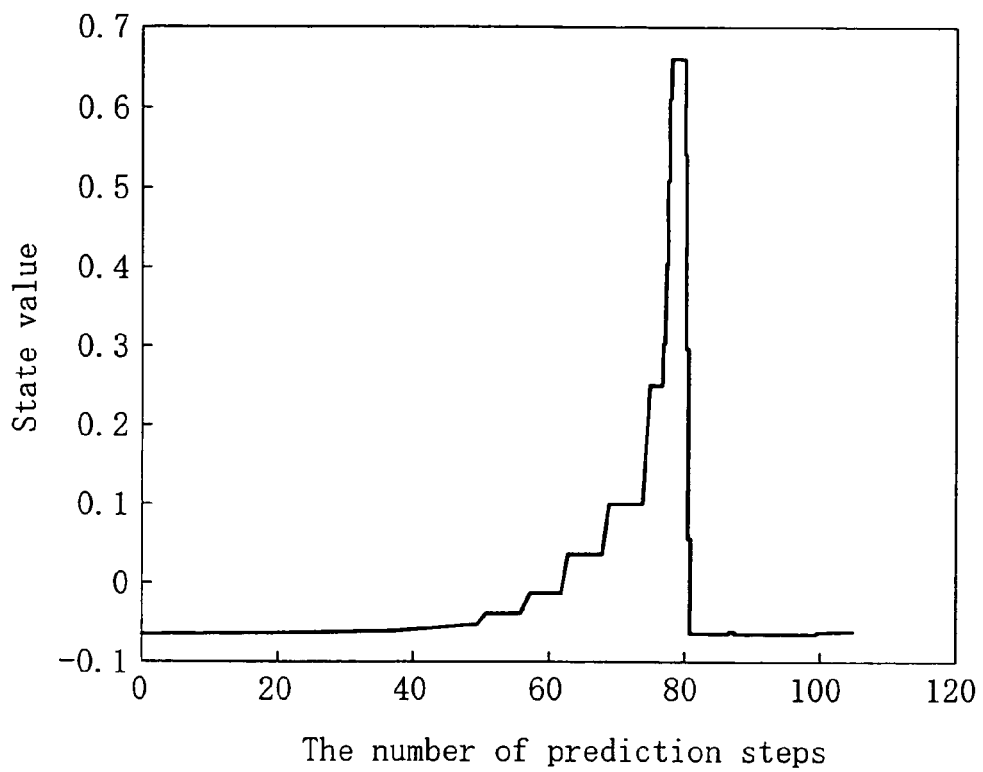
FIG. 8 is a graph illustrating an example for a change in a state value according to the number of prediction steps.

FIG. 8 is a graph illustrating change in the state value obtained by the value conversion section 21, based on the state value of the state value storage section 14A which has been learned by reinforcement learning. In FIG. 8, the ordinate indicates the calculated state value and the abscissa indicates the number of prediction steps. Also in FIG. 8, a problem setting is the same as that of FIG. 1. However, a state space is divided into smaller sections than in FIG. 2, so that the number of prediction steps is increased. In the graph of FIG. 8, with the increase in the number of prediction steps, the state value is increased and a peak appears around 80 steps. In general, as shown in FIG. 8, when a state value enters the already-learned region from the unlearned region, the state value starts increasing, and thereafter it starts decreasing. It can be judged that a timing at which the increase turns to the decrease corresponds to the most significant state that can be predicted from the current state, i.e., a target state.

A target setting section 15A operates in the same manner as in the first embodiment. However, the second embodiment differs from the first embodiment in that a selection signal indicating whether or not a target state could be determined is given to an action selection section 24. A prediction-based action determination section 16A operates to determine an action in the same manner as in the first embodiment and then outputs the determined action as a first action candidate to the action selection section 24.

A policy-based action determination section 23 as a second action determination section determines an action as a predetermined action rule, based on a policy learned by the actor-critic method in reinforcement learning and outputs the determined action as a second action candidate to the action selection section 24.

The action selection section 24 selects, as an actual action to an environment 11, one of the first action candidate received from the prediction-based action determination section 16A and the second action candidate received from the policy-based action determination section 23. For this selection, the selection signal received from the target state determination section 15A is used. Specifically, if the selection signal indicates that the target state could not be decided, the first action candidate received from the prediction-based action determination section 16A is considered not significant and the second action candidate received from the policy-based action determination section 23 is selected as an actual action. Otherwise, the first action candidate received from the prediction-based target state determination section 16A is selected as an actual action.

As has been described, according to this embodiment, if reinforcement learning is used to obtain a state value, the state value, which has been difficult to be given beforehand, can be autonomously achieved, so that predictive action determination can be achieved in a simple manner. Moreover, if the apparatus of this embodiment is viewed as a learning apparatus, a time at which a reward is given is predicted and thus, even though many initial unlearned states exist, an instruction for an action can be obtained. Therefore, efficiency in learning is improved.

Hereinafter, some of results of comparison by simulation between known reinforcement learning (which will be hereinafter referred to as "RL") and a leaning method (i.e., prediction based reinforcement learning, which will be hereinafter referred to as "PRL") according to this embodiment. In this simulation, it was assumed that a reward obtained when a ball was hit was 1.0, a reward obtained when the ball was missed was −1.0, and a reward obtained when a puddle moved to the right or the left was −0.01. Moreover, in PRL, to initially create state values in the state value storage section 14A to a certain extent, for 3000 trials (a trial is a process until a ball hits a lower surface, and will be hereinafter referred to as an "epoch"), action determination was performed in the same manner as in RL. An initial location of the ball in each epoch was set at random.

Figure 13:
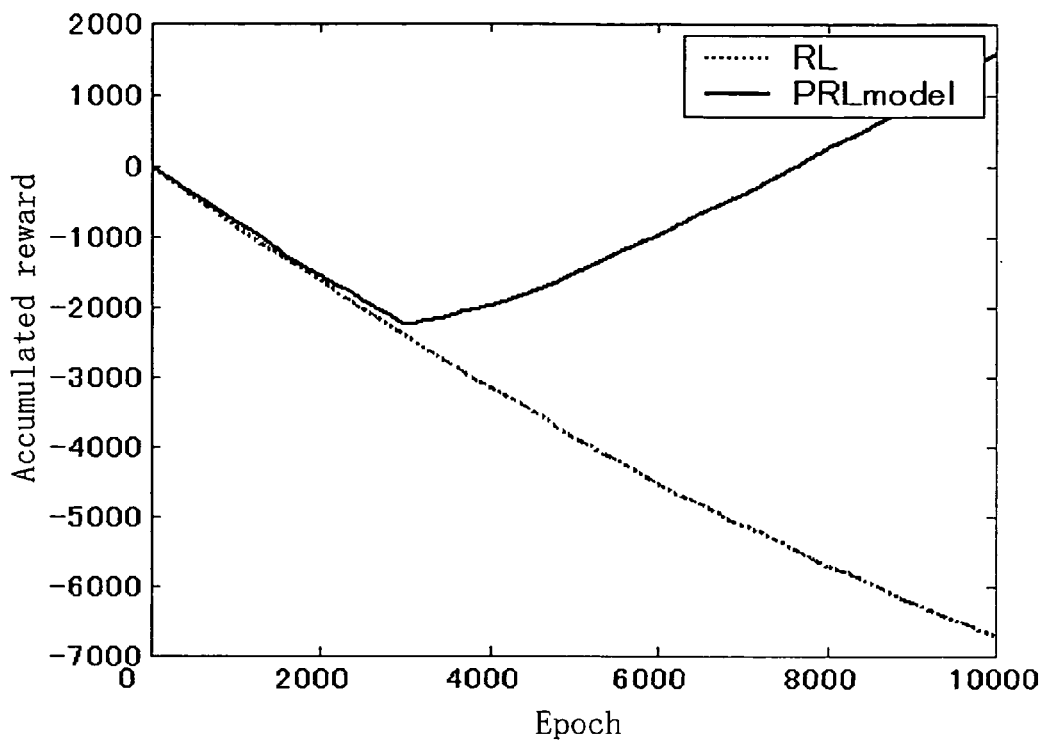
FIG. 13 is a graph showing simulation results for a learning method according to an embodiment of the present invention and known reinforcement learning.

FIG. 13 is a graph showing change in an accumulated reward for each of RL and PRL. The abscissa indicates the number of epochs and the ordinate indicates the accumulated reward. For the first 3000 epochs, almost no difference in the accumulated reward is observed between the RL and PRL. This is because in the period, PRL and RL are operated by the same action determination method and the same learning method. After the 3000 epochs in terms of learning, PRL exhibits a better performance than that of RL by making use of the environment prediction section 13 and the prediction-based action determination section 16A. A reason for this is that in PRL, even when learning is not converged (i.e., the state values in the state value storage section 14A are not completely created), an appropriate action determination can be performed by a prediction, so that the probability of returning a ball becomes higher than that in RL. Moreover, in PRL, an action is determined based on a prediction for a location to which the ball is returned and thus reduction in the probability of performing an unnecessary action is also considered to be one of reasons for the better performance.

Figure 14:
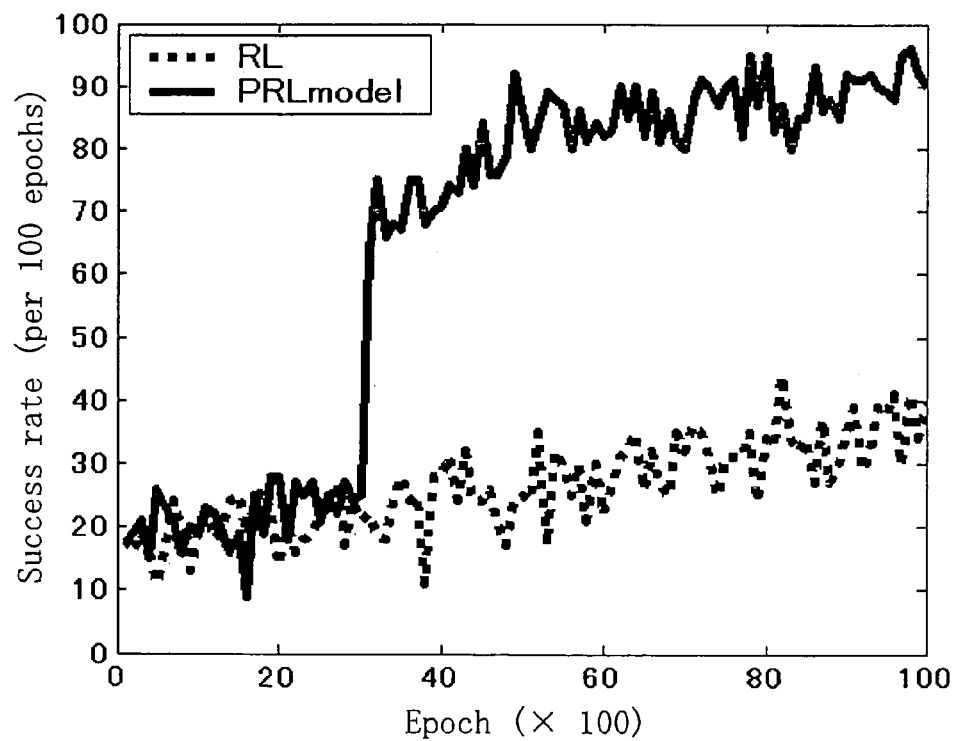
FIG. 14 is a graph showing simulation results for a learning method according to an embodiment of the present invention and known reinforcement learning.

FIG. 14 is a graph showing results of evaluation performed for every 100 learning epochs. The abscissa indicates the number of epochs and the ordinate indicates results for performance evaluation performed for every 100 epochs, i.e., the percentage of a ball being hit. In this case, as the action determination rule for RL, an action strategy called "softmax" was used. The softmax is a method in which action determination is stochastically performed according to a value given to each action in each state. After leaning of the initial 3000 epoch, the performance of PRL is largely improved, compared to RL. This result was obtained largely because with PRL, an appropriate action with respect to a state in which learning has not proceeded yet could be determined by making use of the environment prediction section 13 and the prediction-based action determination section 16A in an initial stage of RL in which learning has proceeded only to the vicinity of a state in which the ball was returned (i.e., a state value was not determined).

Figure 15:
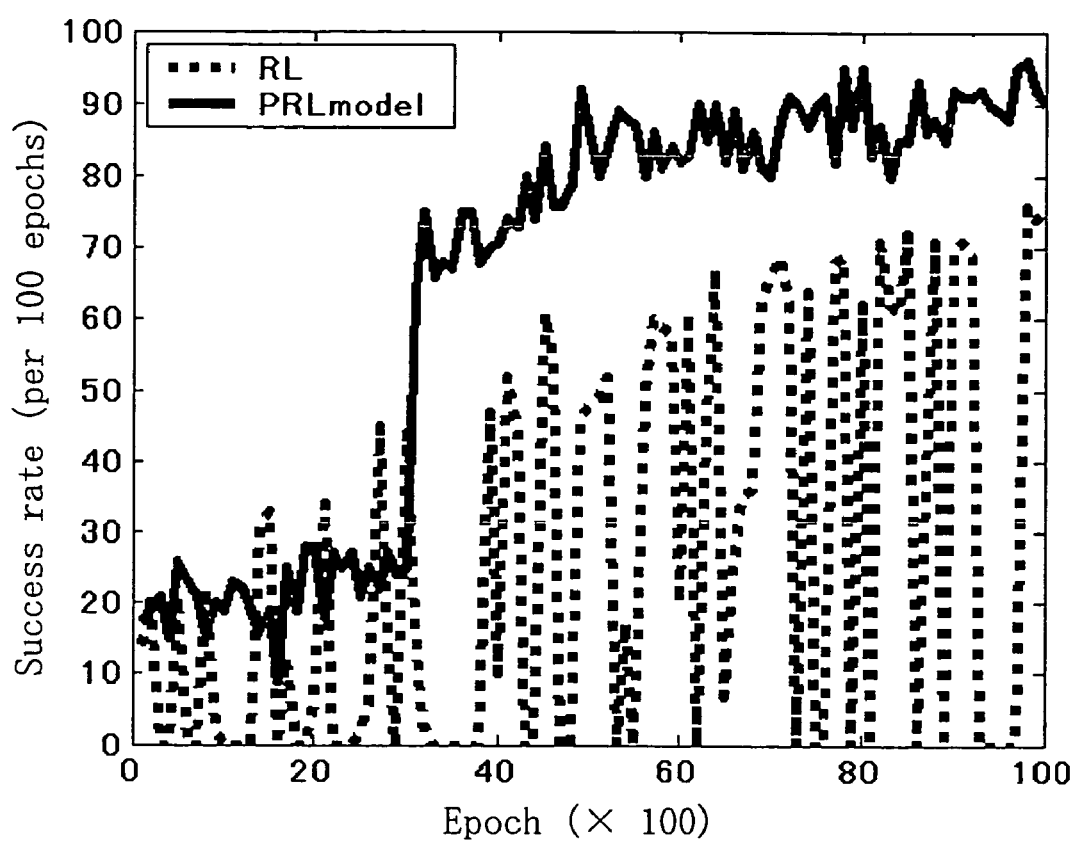
FIG. 15 is a graph showing simulation results for a learning method according to an embodiment of the present invention and known reinforcement learning.

FIG. 15 is a graph obtained when the action determination rule for RL was changed to a greedy strategy. Compared to FIG. 14, the performance of RL as a whole was improved. However, if an evaluation was made in a state in which learning has not been performed, the performance sharply dropped. It can be seen that RL had poor accuracy and did not perform a stable operation, compared to PRL.

Note that in this embodiment, a state value is expressed in the table format and learned by reinforcement learning. However, a state value may be also learned by a neural network. In that case, it is expected to output a value corresponding to an inexperienced state by the generalization ability of the neural network. However, this method is considered effective when the state value has less discontinuity.

(Modified Example of Second Embodiment)

Moreover, in consideration of combinations with learning, a method in which a state at a time when a state value turns from an unlearned state to an already-learned state is determined as a target state can be used. Using this method, in a situation where learning has not proceeded so much, action determination can be performed based on a state value in the already-learned region while in an unlearned region, a future state in the already-learned region can be determined as a target state to perform action determination.

In the second embodiment, in the graph of FIG. 8, the timing when the state value starts decreasing is determined as a target state. However, to make it possible to determine a target state in this manner, state values have to be stored to reach a sufficient amount and this requires an enormous number of times of learning, depending on a problem.

In contrast, according to this modified example, a timing when the target value turns from the unlearned region to the already-learned region is determined as a target state. Thus, even in an initial stage of learning where the unlearned region is large, an action can be determined based on a target state in the unlearned region and an action can be determined based on learning in an already-known region. In FIG. 17, with the unlearned region e2 distinguished from the already-known region e1, action determination is performed.

Figure 18:
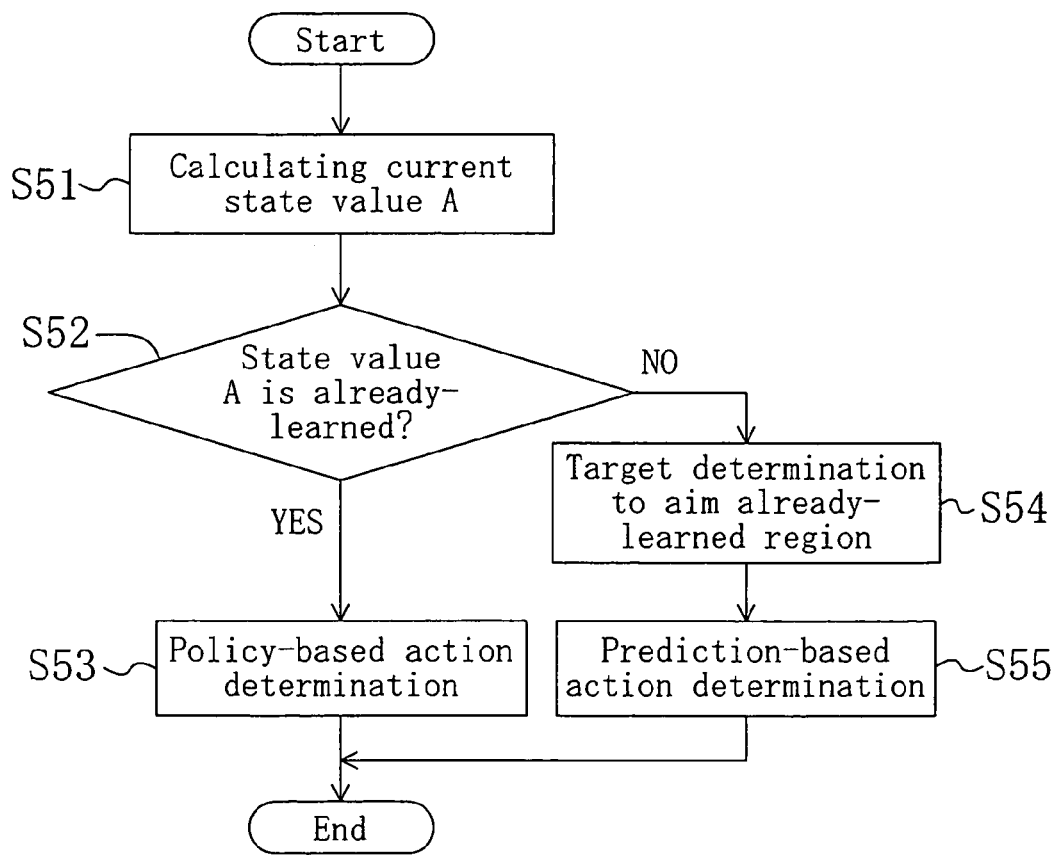
FIG. 18 is a flowchart illustrating the operation of a predictive action determination apparatus according to a modified example of the second embodiment of the present invention.

This modified embodiment is achieved by changing the respective operations of the target state determination section 15A and the action selection section 24 in the configuration of the predictive action determination apparatus 10A of FIG. 6. Hereinafter, the operations will be described with reference to a flowchart of FIG. 18.

First, in Step S51, the target state determination section 15A calculates a current state value A from a current state S (e.g., a current location of a ball) observed by the state observation section 12 via the state value storage section 14A and the value conversion section 21. Next, in Step S52, whether or not the state value A calculated in Step S51 has already been updated by the state value update section 22, i.e., whether or not the state value A has been already learned is judged. If the state value A has been already learned, the process proceeds with Step S53 and, otherwise, the process proceeds with Step S54.

In Step S53, learning of the current state has already proceeded and a state value has been given. Therefore, the target state determination section 15A sends a selection signal to the action selection section 24 so that the second action candidate determined by the policy-based action determination section 23 is selected. Thus, an action determined by the policy-based action determination section 23 is selected as an actual action to the environment 11.

On the other hand, in Step S54, since the current state is still considered to be unlearned, a future state is predicted by the loop operation of the environment prediction section 13, the value conversion section 21 and the target state determination section 15A and then a target state is determined. In this case, when the predicted future state reaches the already-known region in which the state value has been already learned, the future state thereof is determined as a target state. The determined target state is sent to the prediction-based action determination section 16A.

Then, in step S55, the target state determination section 15A sends a selection signal to the action selection section 24 so that the first action candidate determined by the prediction-based action determination section 16A is selected. Thus, the action determined by the prediction-based action determination section 16A is selected as an actual action to the environment 11.

Figure 19:
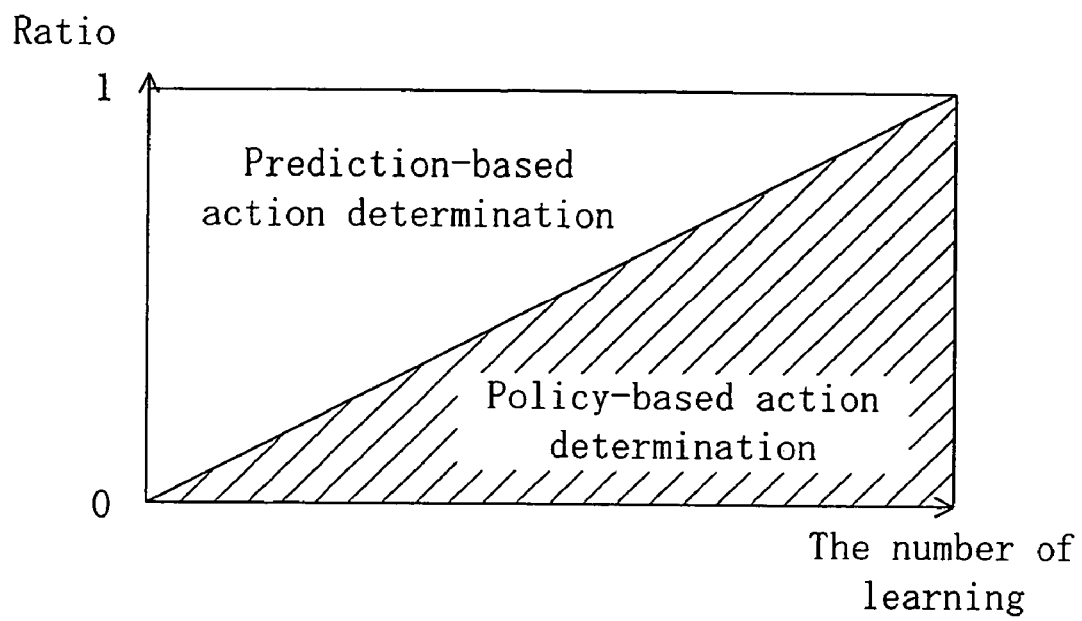
FIG. 19 is a view conceptually illustrating an example for an action selection reference in the modified example of the second embodiment of the present invention.

As has been described, if the determination reference for a target state in the target state determination section 15A and the action selection reference in the action selection section 24 are changed, even in a stage in which learning has not proceeded, action determination can be performed in a larger region by performing prediction-based action determination in the unlearned region in which policy-based action determination can not be performed. FIG. 19 is a view conceptually illustrating action selection in this modified example. As shown in FIG. 19, even when the number of learning is not sufficient, prediction-based action determination is possible, and as learning proceeds, the ratio of policy-based action determination to the whole is gradually increased.

THIRD EMBODIMENT

In the above-described embodiment, the respective functions of the prediction-based action determination sections 16 and 16A have been given beforehand. However, when it is difficult to give the action generation function beforehand, an action generation capability for making a state reach a target state has to be achieved. In this embodiment, the action generation capability is achieved by learning.

Figure 9:
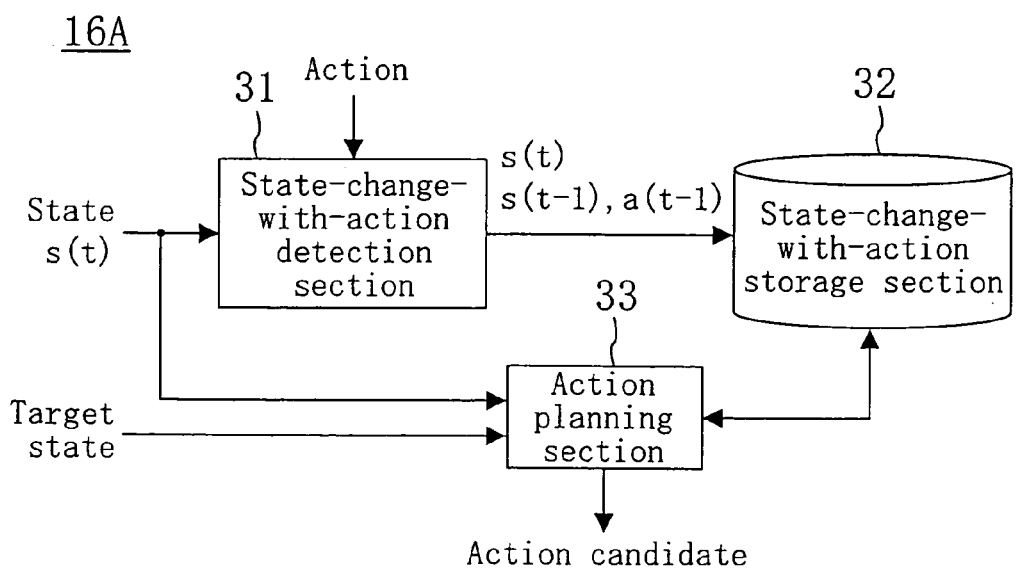
FIG. 9 is a diagram illustrating the internal configuration of a prediction-based action determination section in a third embodiment of the present invention.

FIG. 9 is a diagram illustrating the internal configuration of a prediction-based action determination section 16A in the configuration of FIG. 6 according to this embodiment. In FIG. 9, the reference numeral 31 denotes a state-change-with-action detection section for receiving state data s(t) and detecting a state and an action in the previous step from a current state indicated by the state data s(t), the reference numeral 32 denotes a state-change-with-action storage section for storing, as a state change, the current state s(t) detected by the state-change-with-action detection section 31 and a combination of a state s(t−1) and an action a (t−1) in the previous step, the reference numeral 33 denotes an action planning section for searching the state-change-with-action storage section 32 for the history of state changes in a period from the current state to a target state and determining an action, based on a result of the search.

The operation of the prediction-based action determination section 16A of FIG. 9 will be described with reference to a flowchart of FIG. 10. FIG. 10(a) shows the operation in the case where a state change is stored and FIG. 10(b) shows the operation in the case where action planning is performed. These two operations can be concurrently operated.

If a state change is stored, first, a state s(t) is received from the environment 11 (S31). The current state s(t) and an action a(t) at that time is stored in a working memory. Then, a state s(t−1) and the action a(t−1) in the previous step are drawn out from the working memory (S32) and stored with the state s(t) in the state-change-with-action storage section 32 (S33). This shows a change from the state s(t−1) to the state s(t) made when the action a(t−1) was taken at the state s(t−1), i.e., a state change due to an action.

Moreover, if action planning is performed, first, a target state sent from the target state determination section 15A is set as a state xs (n) desired to be searched (S34). Then, the state xs(n) desired to be searched is searched for in the state-included state change storage section 32 (S35), and if the state xs(n) is detected (YES in S36), a state xs(n−1) and a state xa(n−1), each being stored with the state xs(n) desired to be searched as a pair, are stored in the working memory (S37). Thereafter, the process proceeds with Step S38, and if the state xs(n−1) one step earlier than the state desired to be searched is not the current state s(t−1) (NO in S38), the state desired to be searched is updated (S39) and then the process returns with Step S35. The same process steps are repeatedly executed and in Step S38, if the state xs(n−1) one step earlier than the state desired to be searched matches the current state s(t−1) (YES), a series of the state xs and the action xa which have been stored in the working memory until then is output as an action plan (S3B).

On the other hand, in Step S36, if the state xs(n) desired to be searched can not be detected from the state-change-with-action storage section 32 (NO), it is judged that no possible action is found (S3A) and the process is completed. Note that in such a case, a signal indicating that a correct action can not be determined is output from the prediction-based action determination section 16A and the action selection section 24 selects as an actual action the second action candidate output from the policy-based action determination section 23.

With this operation, the action plan not only for the current action but also for actions from the current state to a target state can be obtained. Therefore, after the action plan has been once completed, action candidates can be sequentially output according to the action plan. Thus, a processing amount is markedly reduced and therefore the operation is preferable especially in the case where there are very few prediction errors for a long future. As a matter of course, an action plan until the target state is reached may be re-calculated for each step. In such a case, even if a prediction is not completed, an action can be determined.

Note that in this embodiment, a backward search is performed in the direction from the target state to the current state. However, even if use is made of a forward search in which s(t+1) is calculated from the current state s(t) and the current action a(t), an action plan can be created in the same manner.

FOURTH EMBODIMENT

In this embodiment, a state prediction is achieved by learning.

FIG. 11 is a diagram illustrating the internal configuration of the environment prediction section 13 in the configuration of FIGS. 4 and 6 according to this embodiment. In FIG. 11, the reference numeral 41 denotes a state change detection section for receiving state data s(t) and detecting a state in the previous step from a current state indicated by the state data s(t), the reference numeral 42 denotes a state change storage section for storing, as a state change, the current state s(t) detected by the state change detection section 41 and a state s(t−1) in the previous step, and the reference numeral 43 denotes a state prediction section for predicting a state after the current state from the state change storage section 42.

The operation of the environment prediction section 13 of FIG. 11 will be described with reference to a flowchart of FIG. 12. FIG. 12(a) shows the operation in the case where a state change is stored and FIG. 12(b) shows the operation in the case where state prediction is performed. These two operations can be concurrently operated.

In the case of storing a state change, first, a state s(t) is received from the environment 10 (S41). The current state s(t) is stored in a working memory. Then, a combination for a state s(t−1) in the previous step is drawn out from the working memory (S42) and stored with the state s(t) in the state change storage section 42. This shows that a state change is made, so that after the state s(t−1), the state has been changed to the state s(t).

Moreover, in the case of performing a state prediction, first, the current state s(t) obtained from the environment 11 is set as a state ys(n) desired to be searched (S44). Then, the state ys(n) desired to be searched is searched for in the state change storage section 42 (S45). If the state ys(n) is detected (YES in S46), a one-step-after state ys(n+1) stored with the state ys(n) as a pair is drawn out from the state change storage section 42 and then is output (S47). Thereafter, the process proceeds with Step S48 and if via the value conversion section 21, a re-prediction request by an evaluation signal is received from the target state determination sections 15 and 15A (YES), the state desired to be searched is updated (S49) and the process returns with Step S45.

On the other hand, in Step S46, if the state ys(n) desired to be searched can not be detected from the state change storage section 42 (NO), it is judged that a prediction is not possible (S4A) and the process is completed. Note that in such a case, a signal indicating that a correct prediction is not possible is output from the environment prediction section 13 and the action selection section 24 selects, as an actual action, the second action candidate output from the policy-based action determination section 23.

With the above-described method, even if the function of the environment prediction section 13 is not created beforehand, the function can be obtained by learning.

Note that for the purpose of learning of the state change storage section 42, the following state can be predicted by an approximation of function method such as a neural network. In such a case, there is possiblity that by the generalization ability of the neural network originally has, an appropriate, one-step-after state s(t+1) can be output to even a state s(t) which has not been experienced.

Note that in each of the above-described embodiments, description has been made mainly by using, as an example, the problem of hitting a ball such as a ping-pong ball. However, the present invention is not limited to application to the problem of hitting a ball but, for example, various other applications such as control of an intelligence house, determination of the operation of a software agent of an information terminal, the movement and action determination of a robot are possible.

Then, one of features of the present invention is that a target state can be autonomously determined among predicted future states, based on a state value, and if the state value is changed, the target state can be automatically changed according to the change in the state value.

For example, when in an intelligent house, equipment such as an air-conditioning is controlled to adjust the room temperature at a comfortable temperature, a prediction for how the room temperature is changed with influence of the outside temperature is possible, in the same manner as for a prediction for the path on which a ball moves. In this case, if a state value for a future state has been already learned (for example, it is more valuable if the room temperature is at a comfortable temperature at a time closer to a time when a person living in the house comes home), a time and a state of the room temperature which are to be targets can be determined among future states. Then, toward the determined target state (i.e., a time when the person comes home and the room temperature), equipment can be controlled beforehand. The prediction-based action determination according to the present invention is very effective in equipment control in which effects of control such as temperature control do not immediately appear.

Moreover, if schedule management is performed in an information terminal, a future schedule of a user can be referred in the same manner as for the path on which the ball moves. In this case, if for an action such as presenting information and providing services (for example, a service providing a digest of economic news), a state value with respect to a future state (for example, the state value is large when the user is traveling to a destination of a business trip) has been already learned, a target state is determined and the operation (such as news search, download and editing) which is to be performed beforehand can be started toward the determined target state (i.e., traveling time). When the state value of each future state is changed according to the schedule, the target state is automatically changed, so that information and services can be provided at an appropriate timing.

INDUSTRIAL APPLICABILITY

According to the present invention, a future state change is more appropriately considered and the accuracy of action determination is improved. Therefore, the present invention is effective, for example, in control of an intelligence house, action determination of a software agent of an information terminal, a control technique for a house-use robot and the like.

The invention claimed is:

1. A predictive action determination apparatus comprising:
   a state observation section for observing a state with respect to a predetermined environment and obtaining state data;
   a state value storage section for storing a state value for each of states of the environment;
   an environment prediction section for predicting a future state change in the environment, based on the state data obtained by the state observation section;
   a target state determination section for determining, as a target state, a future state suitable for action determination among future states predicted by the environment prediction section, based on the state value for each of future states stored in the state value storage section; and
   a first action determination section for determining an action of the apparatus, based on the target state determined by the target state determination section,
   wherein the environment prediction section predicts a future state change in the environment, which is not influenced by actions of the apparatus.

2. The apparatus of claim 1, wherein the target state determination section determines, as a target state, a future state of which a state value is maximal.

3. The apparatus of claim 1, further comprising a state value update section for updating, by learning, the state value stored in the state value storage section, wherein the target state determination section determines, as the target state, one of the future states of which the state value has been already updated by the state value update section.

4. The apparatus of claim 1,
wherein the state value storage section stores a state value for a state including the apparatus, and
wherein the apparatus further includes:
a value conversion section for obtaining, based on the state value stored in the state value storage section, a state value for a future state which is predicted by the environment prediction section and does not include the apparatus and giving the obtained state value to the target state determination section.

5. The apparatus of claim 1, further comprising:
a second action determination section for determining an action of the apparatus, based on a predetermined action rule; and
an action selection section for receiving actions determined by the first and second action determination section, respectively, as first and second action candidates and selecting one of the first and second action candidates as an actual action.

6. The apparatus of claim 5,
wherein the target state determination section gives a selection signal indicating whether or not a target state could be determined to the action selection section, and
wherein if the selection signal indicates that a target state is determined, the action selection section selects the first action candidate while if the selection signal indicates that a target state could not be determined, the action selection section selects the second action candidate.

7. The apparatus of claim 1,
wherein the first action determination section includes:
a state-change-with-action detection section for receiving the state data and detecting, from a current state indicated by the state data, a state and an action in a previous step;
a state-change-with-action storage section for storing, as a state change, a combination of the current state and the state and the action in the previous step detected by the state-change-with-action detection section; and
an action planning section for searching the state-change-with-action storage section for a history of a state change in a period between the current state and the target state and determining an action, based on a result of the search.

8. The apparatus of claim 7, wherein the action planning section performs a backward search in the direction from the target state to the current state when the state change storage section performs the search.

9. A predictive action determination apparatus comprising:
a state observation section for observing a state with respect to a predetermined environment and obtaining state data;
a state value storage section for storing a state value for each of states of the environment;
an environment prediction section for predicting a future state change in the environment, based on the state data obtained by the state observation section;
a target state determination section for determining, as a target state, a future state suitable for action determination among future states predicted by the environment prediction section, based on the state value for each of future states stored in the state value storage section; and
a first action determination section for determining an action of the apparatus, based on the target state determined by the target state determination section,
wherein the target state determination section discounts the state value obtained from the state value storage section according to the number of steps from a current step and uses the discounted state value.

10. A predictive action determination apparatus comprising:
a state observation section for observing a state with respect to a predetermined environment and obtaining state data;
a state value storage section for storing a state value for each of states of the environment;
an environment prediction section for predicting a future state change in the environment, based on the state data obtained by the state observation section;
a target state determination section for determining, as a target state, a future state suitable for action determination among future states predicted by the environment prediction section, based on the state value for each of future states stored in the state value storage section; and
a first action determination section for determining an action of the apparatus, based on the target state determined by the target state determination section,
wherein the environment prediction section includes:
a state change detection section for receiving the state data and detecting a state in a previous step from a current state indicated by the state data;
a state change storage section for storing, as a state change, a combination of the current state and the state in the previous step detected by the state change detection section; and
a state prediction section for predicting a state after the current state from the state change storage section.

11. A method of determining in a predictive action determination apparatus an action of the apparatus, comprising:
a first step of observing a state with respect to a predetermined environment and obtaining state data;
a second step of predicting a future state change in the environment, based on the obtained state data;
a third step of determining, as a target state, a future state suitable for action determination among predicted future states, with reference to the state value for each of the future states; and
a fourth step of determining the action of the apparatus, based on the determined target state,
wherein a predicted state change is a future state change in the environment, which is not influenced by actions of the apparatus.

12. The method of claim 11,
wherein in the third step,
one of the future states of which a state value is maximal is determined as the target state.

13. The method of claim 11,
wherein the predictive action determination apparatus updates a state value for each of states of the environment by learning, and
wherein in the third step, one of the future states of which a state value has been already updated is determined as a target state.

* * * * *